(12) United States Patent
Van Doorselaer (10) Patent No.: US 8,751,149 B2
(45) Date of Patent: Jun. 10, 2014

(54) METHOD OF IDENTIFYING A TEMPORARILY LOCATED ROAD FEATURE, NAVIGATION APPARATUS, SYSTEM FOR IDENTIFYING A TEMPORARILY LOCATED ROAD FEATURE, AND REMOTE DATA PROCESSING SERVER APPARATUS

(75) Inventor: Bart Van Doorselaer, Merelbeke (BE)

(73) Assignee: TomTom Belgium N.V., Ghent (BE)

( * ) Notice: Subject to any disclaimer, the term of this patent is extended or adjusted under 35 U.S.C. 154(b) by 0 days.

(21) Appl. No.: 13/392,565

(22) PCT Filed: Aug. 25, 2010

(86) PCT No.: PCT/EP2010/062380
§ 371 (c)(1),
(2), (4) Date: Jun. 12, 2012

(87) PCT Pub. No.: WO2011/023719
PCT Pub. Date: Mar. 3, 2011

(65) Prior Publication Data
US 2012/0245838 A1      Sep. 27, 2012

(51) Int. Cl.
*G01C 21/26* (2006.01)
(52) U.S. Cl.
USPC ............ 701/408; 701/423; 701/450; 701/451
(58) Field of Classification Search
USPC .................. 701/408, 423, 450, 451
See application file for complete search history.

(56) References Cited

U.S. PATENT DOCUMENTS

| | | | | |
|---|---|---|---|---|
| 6,615,130 B2* | 9/2003 | Myr | | 701/117 |
| 7,427,929 B2* | 9/2008 | Bauer et al. | | 340/905 |
| 8,188,887 B2* | 5/2012 | Catten et al. | | 340/905 |
| 2007/0188348 A1 | 8/2007 | Bauer et al. | | |
| 2008/0255754 A1* | 10/2008 | Pinto | | 701/119 |
| 2008/0258890 A1* | 10/2008 | Follmer et al. | | 340/439 |

FOREIGN PATENT DOCUMENTS

| | | |
|---|---|---|
| DE | 19917154 A1 | 10/2000 |
| EP | 1544637 A2 * | 6/2005 |
| KR | 20040021878 A | 3/2004 |
| WO | 9116699 A1 | 10/1991 |

OTHER PUBLICATIONS

GB Search Report issued Apr. 12, 2011 for Application No. GB1103023.6.

* cited by examiner

*Primary Examiner* — Mary Cheung
*Assistant Examiner* — Michael Berns (57) ABSTRACT

A method of identifying a temporarily located road feature that engenders vehicular speed behavior change comprises a navigation apparatus monitoring speed thereof or a parameter associated therewith. The method also comprises the navigation apparatus generating a message in response to detection of a profile associated with speed of the navigation apparatus and that corresponds to a predetermined speed change profile associated with the presence of the temporarily located road feature.

16 Claims, 7 Drawing Sheets

METHOD OF IDENTIFYING A TEMPORARILY LOCATED ROAD FEATURE, NAVIGATION APPARATUS, SYSTEM FOR IDENTIFYING A TEMPORARILY LOCATED ROAD FEATURE, AND REMOTE DATA PROCESSING SERVER APPARATUS

CROSS-REFERENCE TO RELATED APPLICATIONS

This application is the National Stage of International Application No. PCT/EP2010/062380, filed 25 Aug., 2010 and designating the United States. The entire content of this application is incorporated herein by reference. This application claims the benefit of priority from U.S. provisional application 61/236,547, filed 25 Aug. 2009. The entire content of this application is incorporated herein by reference.

FIELD OF THE INVENTION

The present invention relates to a method of identifying a temporarily located road feature, the method being of the type that, for example, analyses changes of location data. The present invention also relates to a navigation apparatus of the type that, for example, generates location data associated with a location of the navigation apparatus. The present invention also relates to a system for identifying a temporarily located road feature of the type that, for example, analyses changes of location data. The present invention further relates to a remote data processing server apparatus of the type that, for example, identifies a location of a temporarily located road feature.

BACKGROUND TO THE INVENTION

Portable computing devices, for example Portable Navigation Devices (PNDs) that include GPS (Global Positioning System) signal reception and processing functionality are well known and are widely employed as in-car or other vehicle navigation systems.

In general terms, a modern PND comprises a processor, memory and map data stored within said memory. The processor and memory cooperate to provide an execution environment in which a software operating system is typically established, and additionally it is commonplace for one or more additional software programs to be provided to enable the functionality of the PND to be controlled, and to provide various other functions.

Typically, these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In one particular arrangement, the output interface display may be configured as a touch sensitive display (by means of a touch sensitive overlay or otherwise) additionally to provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Bluetooth, Wi-Fi, Wi-Max, GSM, UMTS and the like.

PNDs of this type also include a GPS antenna by means of which satellite-broadcast signals, including location data, can be received and subsequently processed to determine a current location of the device.

The PND may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically, such features are most commonly provided in in-vehicle navigation systems, but may also be provided in PNDs if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the driver's own preferences for the factors determining road choice (for example the driver may specify that the route should not include motorways or toll roads).

The device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking), are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant), a media player, a mobile telephone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, the Royal Automobile Club (RAC) provides an on-line route planning and navigation facility at http://www.rac.co.uk, which facility allows a user to enter a start point and a destination whereupon the server with which the user's computing resource is communicating calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated, a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

It is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above, for example the GO 930 Traffic model manufactured and supplied by TomTom International B.V., provide a reliable means for enabling users to navigate from one position to another. Such devices are of great utility when the user is not familiar with the route to the destination to which they are navigating.

An ability to warn as to the oncoming presence of a so-called "safety camera" is a useful feature that some known PNDs offer, usually based upon a subscription service. In this respect, data concerning the locations of safety cameras on a map stored and used by the PND can be downloaded. The downloaded data is then used in conjunction with a current location of a user and a direction of travel to warn the user when approaching a safety camera on a route being followed. However, the safety camera data used only relates to fixed safety cameras and not to mobile safety cameras. This is not surprising because, by their very nature, mobile safety cameras only reside at a given location temporarily and then move to another location.

Consequently, PNDs are typically not capable of providing alerts to users as to when mobile safety cameras are being approached. A road user therefore has to rely upon other means of obtaining this information, for example by listening to a radio station and hoping an announcement will be made by a presenter as to the location of a safety camera that the road user may be approaching. A relevant announcement is only likely to be made by local radio stations as opposed to radio stations with nationwide or even regional coverage. Furthermore, for such an announcement to be made by a radio station, the radio station or some other traffic service provider has to receive advice from road users as to the location of a mobile safety camera, i.e. this advice needs to be provided actively by road users upon spotting a safety camera. Hence, if there is apathy amongst road users (in an area near a mobile safety camera) to report the presence of the mobile safety camera, the necessary information will not be acquired and hence other road users will not be advised. Additionally, in respect of a vocal radio broadcast, there is a limit to the number of safety cameras that can be mentioned, i.e. there is a limit to the number of locations of safety cameras that a broadcaster is willing to announce without spoiling a show. Also, there can be a delay between the initial advice of a location of a safety camera and the announcement to all interested road users, by which time the mobile safety camera may have changed location.

SUMMARY OF THE INVENTION

According to a first aspect of the present invention, there is provided a method of identifying a temporarily located road feature that engenders vehicular speed behaviour change, the method comprising: a navigation apparatus monitoring speed thereof or a parameter associated therewith; the navigation apparatus generating a message in response to detection of a profile associated with speed of the navigation apparatus and that corresponds to a predetermined speed change profile associated with the presence of the temporarily located road feature.

The predetermined speed change profile may be substantially U-shaped.

The predetermined speed change profile may comprise a first portion corresponding to a reduction in speed.

The predetermined speed change profile may comprise a second portion corresponding to maintaining speed substantially below or substantially equal to a speed limit. The maintenance of the speed may be for a minimum predetermined duration.

The predetermined speed change profile may comprise a third portion corresponding to an increase in speed.

The maintenance of the second portion may follow the first portion. The third portion may follow the second portion.

According to a second aspect of the present invention, there is provided a method of providing an alert as to the existence of a temporarily located road feature, the method comprising: identifying the temporarily located road feature using the method of identifying a temporarily located road feature as set forth above in relation to the first aspect of the invention; a remote data processing resource receiving the message; and the remote data processing resource communicating a location associated with the detected speed change for receipt by a plurality of apparatus arranged to provide alerts as to the existence of the temporarily located road feature.

The remote data processing resource may receive a plurality of messages associated with detection of the temporarily located road feature; the plurality of messages may comprise the message; and the remote data processing resource may correlate locations identified by the plurality of messages in order to confirm the existence of the temporarily located road feature.

The method may further comprise: accessing data identifying locations of known permanent road features of the same type as the temporarily located road feature; and wherein the remote data processing resource may compare the identified location of the temporarily located road feature with the locations of the known permanent road features in order to eliminate incorrectly identifying a location of a permanent road feature as a location of a temporarily located road feature.

The remote data processing resource may assign a predetermined validity period to the location of the temporarily located road feature.

In addition to identification in the message of the location of the temporarily located road feature by detection of the profile associated with speed of the navigation apparatus, the remote data processing resource may be arranged to receive confirmatory data.

The confirmatory data may be based upon information obtained from a telephone call received or a message received via a messaging service.

The call received may be associated with a user of the navigation apparatus. The message received via the messaging service may be associated with a user of the navigation apparatus.

The navigation apparatus may be arranged to provide an input element; the confirmatory data may be generated in response to a user providing a confirmatory indication via the input element.

The input element may be a hardware button or a virtual button.

The message may comprise the confirmatory data. The confirmatory data may be communicated to the remote data processing resource in addition to the message.

According to a third aspect of the present invention, there is provided a computer program element comprising computer program code means to make a computer execute the method as set forth above in relation to the first or second aspects of the invention.

The computer program element may be embodied on a computer readable medium.

According to a fourth aspect of the present invention, there is provided a navigation apparatus comprising: a wireless communications unit for data communication via a wireless communications network; a processing resource arranged to support, when in use, an operational environment, the operational environment supporting a location determination module; wherein the processing resource is arranged to monitor speed of the apparatus or a parameter associated therewith using data provided by the location determination module; and the processing resource is arranged to generate a message in response to detection of a profile associated with speed of the apparatus and corresponding to a predetermined speed change profile associated with the presence of the temporarily located road feature.

The processing resource may be arranged to receive data identifying detection of a confirmatory gesture associated with detection of the presence of the temporarily located road feature.

The confirmatory gesture may be actuation of a button. The button may be a hardware button or a virtual button. The confirmatory input may be a vocal indication.

According to a fifth aspect of the present invention, there is provided a system for identifying a temporarily located road feature that engenders vehicular speed behaviour change, the system comprising: a navigation apparatus as set forth above in relation to the fourth aspect of the invention; and a remote data processing resource arranged to receive the message; wherein the remote data processing resource is arranged to communicate a location associated with the detected speed change for receipt by a plurality of apparatus arranged to provide alerts as to the existence of the temporarily located road feature.

According to a sixth aspect of the present invention, there is provided a remote data processing server apparatus for identifying a temporarily located road feature that engenders vehicular speed behaviour change, the server comprising: a processing resource arranged to support, when in use, an operational environment, the operational environment supporting a reception unit arranged to receive a message identifying a location of a temporarily located road feature; and wherein the processing resource is arranged to communicate via a wireless communications unit the location of the temporarily located road feature for receipt by a plurality of apparatus arranged to provide alerts as to the existence of the temporarily located road feature.

The reception unit may be arranged to receive a plurality of messages including the message identifying the location of the temporarily located road feature, the processing resource being arranged to correlate the plurality of messages in order to confirm the existence of the temporarily located road feature.

The message may comprise data identifying the location of the temporarily located road feature. The message may comprise data indicative of the nature of the message, for example that the message identifies the location of the temporarily located road feature.

The temporarily located road feature may be a safety camera, for example a mobile safety camera.

Advantages of these embodiments are set out hereafter, and further details and features of each of these embodiments are defined in the accompanying dependent claims and elsewhere in the following detailed description.

It is thus possible to provide a navigation apparatus, a server apparatus, a system and a method capable of supporting the provision of a location of a mobile safety camera in a manner that does not solely rely upon active reporting of the mobile safety cameras by road users. Furthermore, the likelihood of data errors as a result of false or erroneous alerts being provided is mitigated. The navigation apparatus, the server apparatus, system and method thus provide an improved user experience in relation to the navigation apparatus, as well as the possibility of saving the user time and inconvenience. Indeed, the ability to provide alerts as to the existence of mobile safety cameras reduces driver workload as it is no longer necessary for a driver to listen specifically for such alerts whilst driving. Additionally, the user has increased flexibility in relation to choice of radio station to which to listen, because the driver is not necessarily constrained to listen to radio stations that make announcements as to the locations of mobile safety cameras.

BRIEF DESCRIPTION OF THE DRAWINGS

At least one embodiment of the invention will now be described, by way of example only, with reference to the accompanying drawings, in which.

DETAILED DESCRIPTION OF PREFERRED EMBODIMENTS

Throughout the following description identical reference numerals will be used to identify like parts.

Embodiments of the present invention will now be described with particular reference to a PND. It should be remembered, however, that the teachings herein are not limited to PNDs but are instead universally applicable to any type of processing device that is configured to execute navigation software in a portable and/or mobile manner so as to provide route planning and navigation functionality. It follows therefore that in the context of the embodiments set forth herein, a navigation apparatus is intended to include (without limitation) any type of route planning and navigation apparatus, irrespective of whether that device is embodied as a PND, a vehicle such as an automobile, or indeed a portable computing resource, for example a portable personal computer (PC), a mobile telephone or a Personal Digital Assistant (PDA) executing route planning and navigation software.

Figure 1:
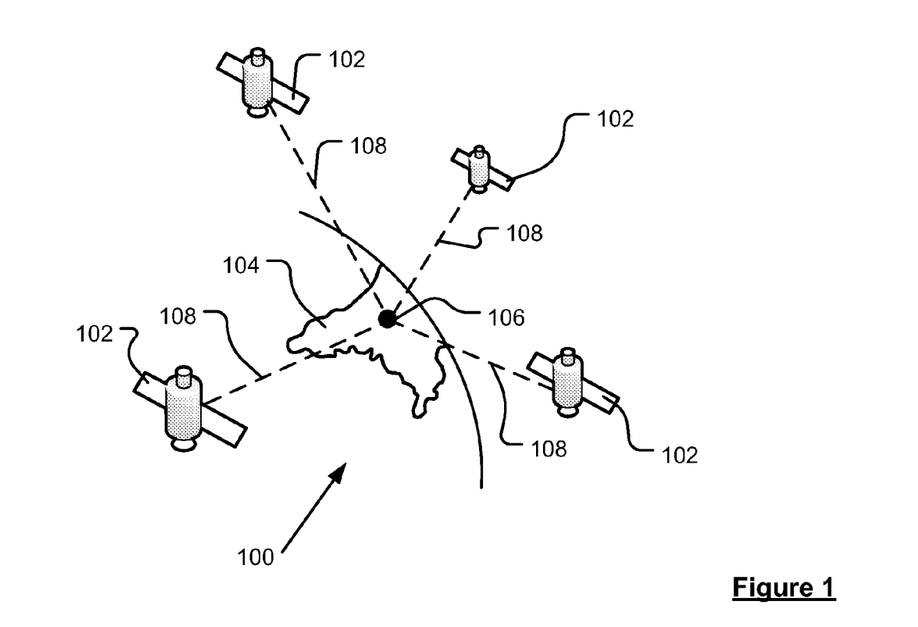
FIG. 1 is a schematic illustration of an exemplary part of a Global Positioning System (GPS) usable by a navigation apparatus.

With the above provisos in mind, the Global Positioning System (GPS) of FIG. 1 and the like are used for a variety of purposes. In general, the GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal allows the receiving device to calculate its three dimensional position by the same geometrical calculation in a known manner. The position and velocity data can be updated in real time on a continuous basis by an unlimited number of users.

As shown in FIG. 1, the GPS system 100 comprises a plurality of satellites 102 orbiting about the earth 104. A GPS receiver 106 receives spread spectrum GPS satellite data signals 108 from a number of the plurality of satellites 102. The spread spectrum data signals 108 are continuously transmitted from each satellite 102, the spread spectrum data signals 108 transmitted each comprise a data stream including information identifying a particular satellite 102 from which the data stream originates. The GPS receiver 106 generally requires spread spectrum data signals 108 from at least three satellites 102 in order to be able to calculate a two-dimensional position. Receipt of a fourth spread spectrum data signal enables the GPS receiver 106 to calculate, using a known technique, a three-dimensional position.

Figure 2:
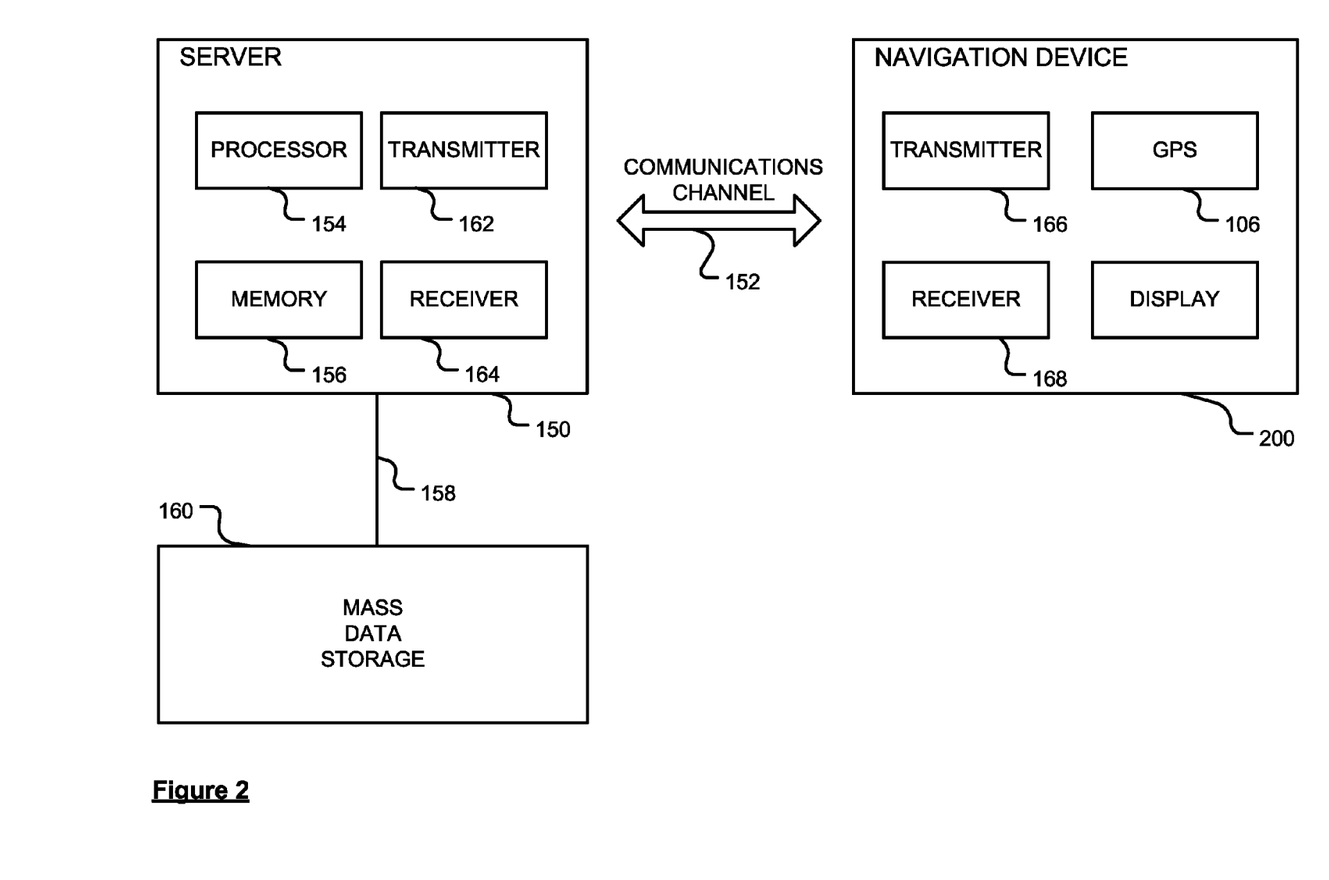
FIG. 2 is a schematic diagram of a communications system for communication between a navigation apparatus and a server apparatus.

In FIG. 2, a navigation system comprises a navigation apparatus 200 capable of communicating, if desired in an embodiment, with a server 150 via a communications channel 152 supported by a communications network, for example a Wide Area Network (WAN), such as the Internet, that can be implemented by any of a number of different arrangements. The communication channel 152 generically represents the propagating medium or path that connects the navigation apparatus 200 and the server 150. The server 150 and the navigation apparatus 200 can communicate when a connection via the communications channel 152 is established between the server 150 and the navigation apparatus 200 (noting that such a connection can be a data connection via mobile device, a direct connection via personal computer via the Internet, etc.).

The communication channel 152 is not limited to a particular communication technology. Additionally, the communication channel 152 is not limited to a single communication technology; that is, the channel 152 may include several communication links that use a variety of technology. For example, the communication channel 152 can be adapted to provide a path for electrical, optical, and/or electromagnetic communications, etc. As such, the communication channel 152 includes, but is not limited to, one or a combination of the following: electric circuits, electrical conductors such as wires and coaxial cables, fibre optic cables, converters, radio-frequency (RF) waves, the atmosphere, free space, etc. Furthermore, the communication channel 152 can include intermediate devices, for example: routers, repeaters, buffers, transmitters, and receivers.

In one illustrative arrangement, the communication channel 152 is supported by telephone and computer networks. Furthermore, the communication channel 152 may be capable of accommodating wireless communication, for example, infrared communications, radio frequency communications, such as microwave frequency communications, etc. Additionally, the communication channel 152 can accommodate satellite communication.

Both digital and analogue signals can be transmitted through the communication channel 152. These signals can be modulated, encrypted and/or compressed signals as can be desirable for the communication technology.

In this example, the navigation apparatus 200 comprises mobile telephone technology, more details of which will be described later herein. As such, mobile telephone technology within the navigation apparatus 200 can establish a network connection between the navigation apparatus 200 and the server 150, via the Internet for example, in a manner similar to that of any wireless communications-enabled terminal. However, the navigation apparatus 200 comprising or coupled to the GPS receiver device 106, is capable of establishing a data session, if required, with the network hardware of the communications network via a wireless communications terminal (not shown), such as a mobile telephone, PDA, and/or any device equipped with mobile telephone technology, in order to establish a digital connection, for example a digital connection via known Bluetooth technology. Thereafter, through its network service provider, the mobile terminal can establish the network connection (through the Internet for example) with the server 150.

As such, the "mobile" network connection can be established between the navigation apparatus 200 (which can be, and often times is, mobile as it travels alone and/or in a vehicle) and the server 150 and constitutes the communication channel 152.

Further, establishing the network connection between the mobile device (via a service provider) and another device such as the server 150, using the Internet for example, can be achieved using any number of appropriate data communications protocols, for example the TCP/IP layered protocol. Furthermore, the mobile device can utilize any number of communication standards such as CDMA2000, GSM, IEEE 802.11 a/b/c/g/n, etc.

Hence, it can be seen that the Internet connection may be utilised, which can be achieved via a data connection using the mobile telephone or mobile telephone technology.

The server 150 includes, in addition to other components which may not be illustrated, a processor 154 operatively connected to a memory 156 and further operatively connected, via a wired or wireless connection 158, to a mass data storage device 160. The mass storage device 160 contains a store of navigation data and map information, and can again be a separate device from the server 150 or can be incorporated into the server 150. The processor 154 is further operatively connected to transmitter 162 and receiver 164, to transmit and receive information to and from navigation apparatus 200 via the communications channel 152. The signals sent and received may include data, communication, and/or other propagated signals. The transmitter 162 and receiver 164 may be selected or designed according to the communications requirement and communication technology used in the communication design for the navigation system 200. Further, it should be noted that the functions of transmitter 162 and receiver 164 may be combined into a single transceiver.

As mentioned above, the navigation apparatus 200 can be arranged to communicate with the server 150 through communications channel 152, using transmitter 166 and receiver 168 to send and receive signals and/or data through the communications channel 152, noting that these devices can further be used to communicate with devices other than the server 150, for example other servers (not shown). Further, the transmitter 166 and receiver 168 constitute a communications unit and are selected or designed according to communication requirements and communication technology used in the communication design for the navigation apparatus 200 and the functions of the transmitter 166 and receiver 168 may be combined into a single transceiver as described above in relation to FIG. 2. Of course, the navigation apparatus 200 comprises other hardware and/or functional parts, which will be described later herein in further detail.

Software stored in server memory 156 provides instructions for the processor 154 and allows the server 150 to provide services to the navigation apparatus 200. One service provided by the server 150 involves alerting navigation apparatus as to the locations of mobile safety cameras.

Figure 3:
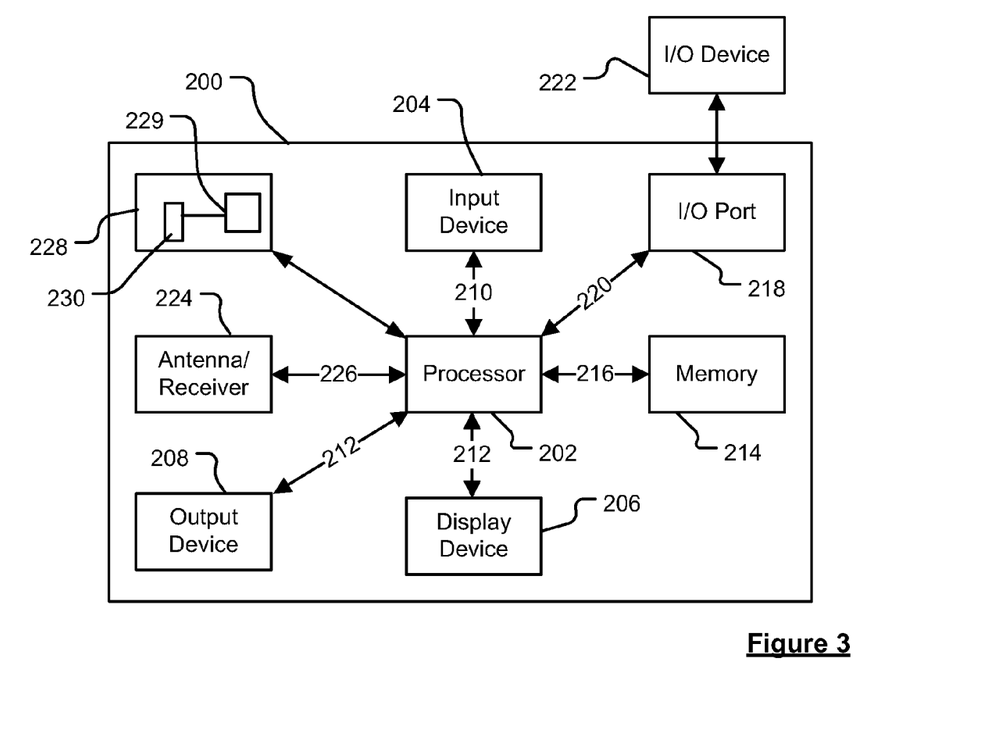
FIG. 3 is a schematic illustration of components of the navigation apparatus of FIG. 2 or any other suitable navigation apparatus.

Referring to FIG. 3, it should be noted that the block diagram of the navigation apparatus 200 is not inclusive of all components of the navigation apparatus, but is only representative of many example components. The navigation apparatus 200 is located within a housing (not shown). The navigation apparatus 200 includes a processing resource comprising, for example, the processor 202, the processor 202 being coupled to an input device 204 and a display device, for example a display screen 206. Although reference is made here to the input device 204 in the singular, the skilled person should appreciate that the input device 204 represents any number of input devices, including a keyboard device, voice input device, touch panel and/or any other known input device utilised to input information. Likewise, the display screen 206 can include any type of display screen such as a Liquid Crystal Display (LCD), for example.

In one arrangement, one aspect of the input device 204, the touch panel, and the display screen 206 are integrated so as to provide an integrated input and display device, including a touchpad or touchscreen input 250 (FIG. 4) to enable both input of information (via direct input, menu selection, etc.) and display of information through the touch panel screen so that a user need only touch a portion of the display screen 206 to select one of a plurality of display choices or to activate one of a plurality of virtual or "soft" buttons. In this respect, the processor 202 supports a Graphical User Interface (GUI) that operates in conjunction with the touchscreen.

In the navigation apparatus 200, the processor 202 is operatively connected to and capable of receiving input information from the input device 204 via a connection 210, and operatively connected to at least one of the display screen 206 and the output device 208, via respective output connections 212, to output information thereto. The navigation apparatus 200 can include an output device 208, for example an audible output device (e.g. a loudspeaker). As the output device 208 can produce audible information for a user of the navigation apparatus 200, it should be understood equally that input device 204 can include a microphone and software for receiving input voice commands as well. Further, the navigation apparatus 200 can also include any additional input device 204 and/or any additional output device, such as audio input/ output devices for example. The processor 202 is operably coupled to a memory resource 214 via connection 216 and is further adapted to receive/send information from/to input/ output (I/O) ports 218 via connection 220, wherein the I/O port 218 is connectible to an I/O device 222 external to the navigation apparatus 200. The memory resource 214 comprises, for example, a volatile memory, such as a Random Access Memory (RAM) and a non-volatile memory, for example a digital memory, such as a flash memory. The external I/O device 222 can include, but is not limited to an external listening device, such as an earpiece for example. The connection to I/O device 222 can further be a wired or wireless connection to any other external device such as a car stereo unit for hands-free operation and/or for voice activated operation for example, for connection to an earpiece or headphones, and/or for connection to a mobile telephone for example, wherein the mobile telephone connection can be used to establish the data connection between the navigation apparatus 200 and the server 150 via the Internet or any other network for example.

FIG. 3 further illustrates an operative connection between the processor 202 and an antenna/receiver 224 via connection 226, wherein the antenna/receiver 224 can be a GPS antenna/ receiver for example. It should be understood that the antenna and receiver designated by reference numeral 224 are combined schematically for illustration, but that the antenna and receiver may be separately located components, and that the antenna may be a GPS patch antenna or helical antenna for example.

As mentioned above, in order to support communications in a Universal Mobile Telecommunications System (UMTS), the processor 202 is also coupled to a cellular communications module 228 constituting the mobile telephone technology. The cellular communications module 228 supports a communications interface 229 for transmitting and receiving data wirelessly. The cellular communications module 228 comprises a Subscriber Identity Module (SIM) 230 coupled thereto having a data subscription associated therewith. The subscription is, in this example, for a limited data usage over a pre-determined period of time, for example a calendar month. For example, the data limit may be 1 GB per month. In other embodiments, the subscription need not have a data usage limit. The cellular communications module 228 supports a bidirectional data communications service, for example a packet switched data service, such as a General Packet Radio Service (GPRS) supported by the GSM communications network and/or a High Speed Downlink Packet Access (HSDPA) service supported by the UMTS network. The communications interface 229 is therefore compatible with the bidirectional data communications service. The bidirectional data communications service supports an Internet Protocol (IP) for data communications although use of other protocols is contemplated.

It will, of course, be understood by one of ordinary skill in the art that the electronic components shown in FIG. 3 are powered by one or more power sources (not shown) in a conventional manner. As will be understood by one of ordinary skill in the art, different configurations of the components shown in FIG. 3 are contemplated. For example, the components shown in FIG. 3 may be in communication with one another via wired and/or wireless connections and the like. Thus, the navigation apparatus 200 described herein can be a portable or handheld navigation device 200.

In addition, the portable or handheld navigation device 200 of FIG. 3 can be connected or "docked" in a known manner to a vehicle such as a bicycle, a motorbike, a car or a boat for example. Such a navigation device 200 is then removable from the docked location for portable or handheld navigation use.

Figure 4:
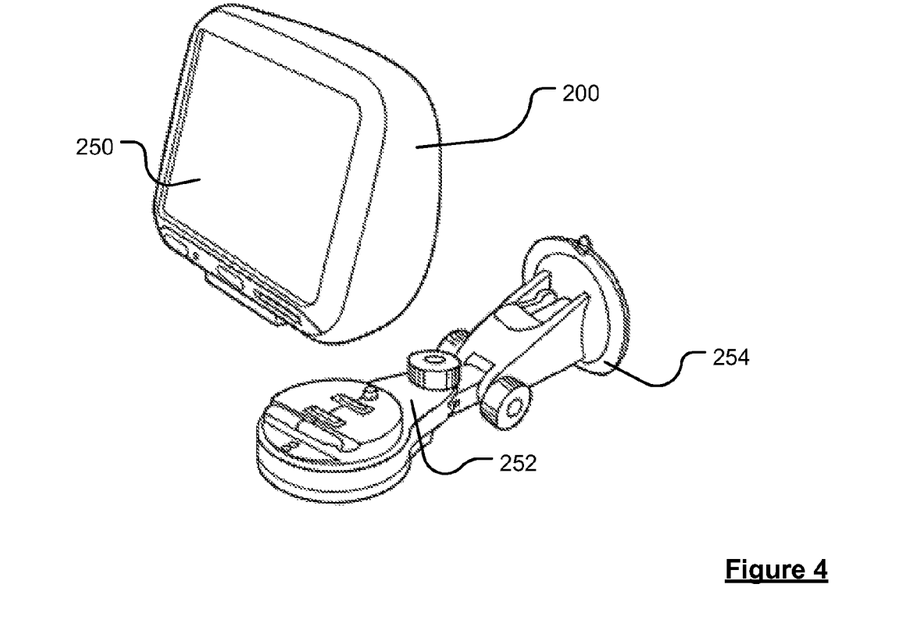
FIG. 4 is a schematic diagram of an arrangement of mounting and/or docking a navigation apparatus.

Referring to FIG. 4, the navigation apparatus 200 can be a unit that includes the integrated input and display device 206 and the other components of FIG. 2 (including, but not limited to, the internal GPS receiver 224, the microprocessor 202, a power supply (not shown), memory systems 214, etc.).

The navigation apparatus 200 can sit on an arm 252, which itself may be secured to a vehicle dashboard/window/etc. using a suction cup 254. This arm 252 is one example of a docking station to which the navigation apparatus 200 can be docked. The navigation apparatus 200 can be docked or otherwise connected to the arm 252 of the docking station by snap connecting the navigation apparatus 200 to the arm 252 for example. The navigation apparatus 200 may then be rotatable on the arm 252. To release the connection between the navigation apparatus 200 and the docking station, a button (not shown) on the navigation apparatus 200 may be pressed, for example. Other equally suitable arrangements for coupling and decoupling the navigation apparatus 200 to a docking station are well known to persons of ordinary skill in the art.

Figure 5:
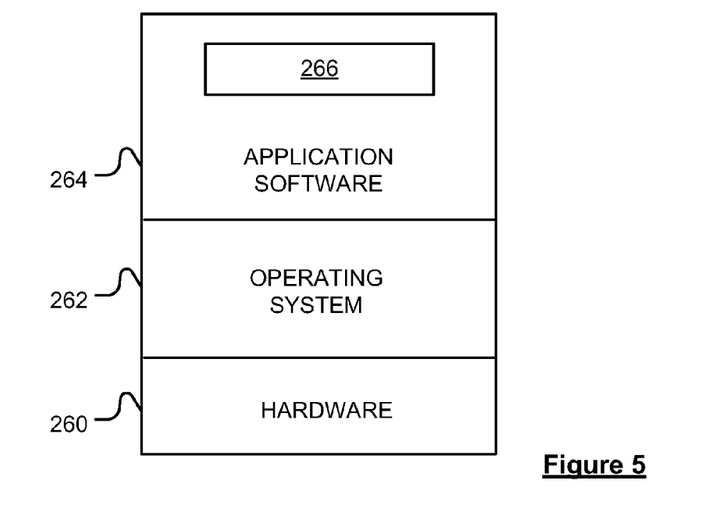
FIG. 5 is a schematic representation of an architectural stack employed by the navigation apparatus of FIG. 3.

Turning to FIG. 5, the memory resource 214 stores a boot loader program (not shown) that is executed by the processor 202 in order to load an operating system 262 from the memory resource 214 for execution by functional hardware components 260, which provides an environment in which application software 264 can run. The application software 264 provides an operational environment including the GUI that supports core functions of the navigation apparatus 200, for example map viewing, route planning, navigation functions and any other functions associated therewith. In this respect, part of the application software 264 comprises a safety camera detection module 266. However, the safety camera detection module 266 is just one example of a module to detect the presence of a temporarily located road feature. In this respect, a safety camera is an example of a road feature. In particular, a mobile safety camera is by nature temporarily located and moves to other locations after a period of time. Although not shown in FIG. 5, the operational environment also supports a location determination module that uses data obtained from the GPS receiver 224.

Figure 6:
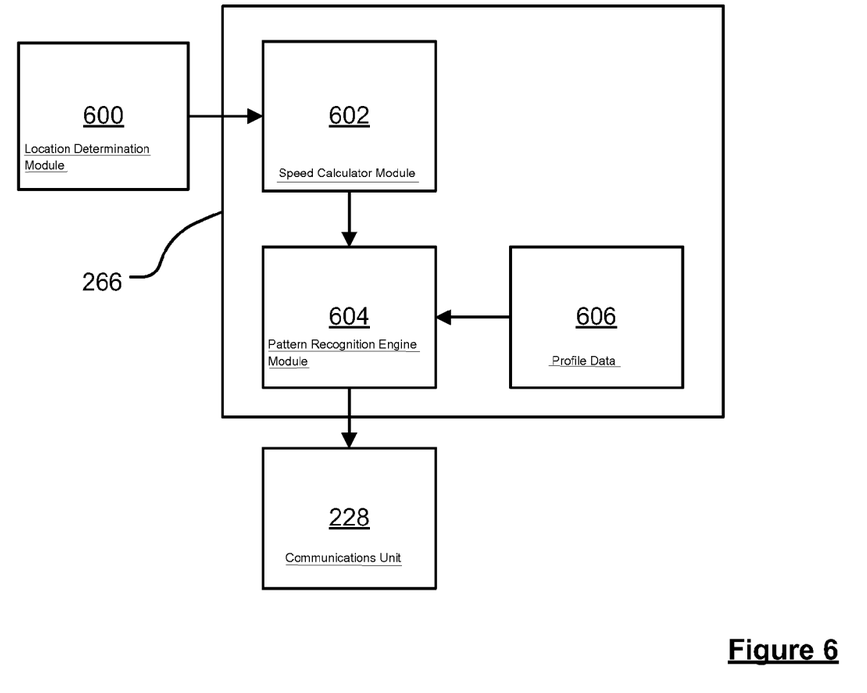
FIG. 6 is a schematic diagram of a safety camera detection module of FIG. 5 in greater detail.

Referring to FIG. 6, supported by the processing resource, the safety camera detection module 266 is operably coupled to the location determination module 600, the location determination module 600, in particular, being operably coupled to a speed calculator module 602. The speed calculator module 602 is operably coupled to a pattern recognition engine module 604, the pattern recognition engine module 604 being capable of accessing the memory 214 in order to access predetermined profile data 606. Additionally, the pattern recognition engine module 694 is operably coupled to the communications unit 228.

In operation (FIG. 7), a user of the navigation apparatus 200 is travelling with the navigation apparatus 200. The user can be driving a vehicle, for example an automobile, or a passenger in the vehicle. The navigation apparatus 200 need not be engaged in providing navigation assistance to a location, for example a destination. In this regard, the navigation apparatus 200 can simply be employed for the sake of so-called free-driving mentioned above. Consequently, for the sake of clarity and conciseness of description, the following operational example will be described in the context of the navigation apparatus 200 simply providing a monitoring function and not providing navigation assistance. However, the skilled person should appreciate that the following functionality can be provided whilst providing navigation assistance.

In this example, a vehicle (in which the navigation apparatus 200 is located) travelling along the road is exceeding a speed limit for the road. Whilst travelling along the road, the driver notices that a mobile safety camera vehicle, parked at the side of the road, is being approached. The driver therefore brakes suddenly for the time necessary to pass a detection window of the mobile safety camera. Thereafter, the driver increases the speed of the vehicle to exceed the speed limit for the road once more.

Figure 8:
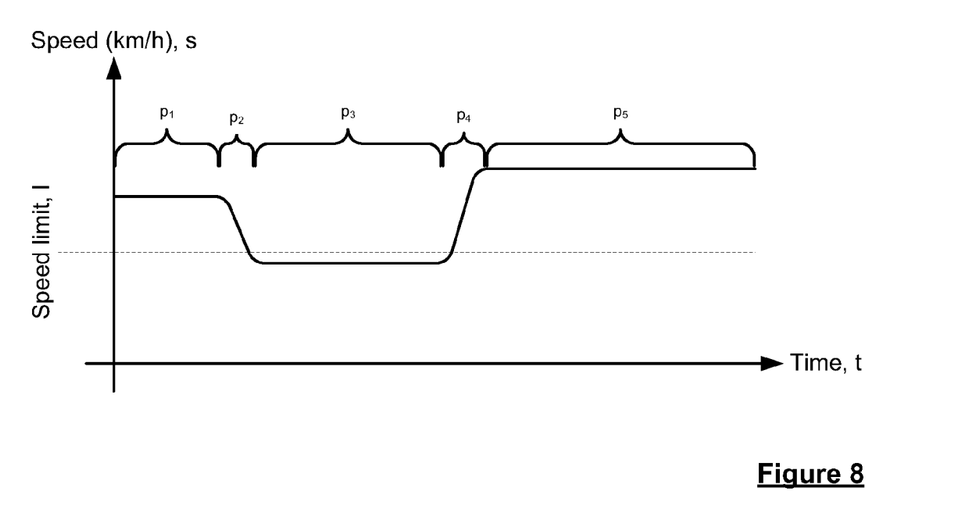
FIG. 8 is a graph of a speed change profile.

Clearly, for drivers intent upon breaching local speed limits, this pattern of behaviour will be common when the mobile safety camera is approached. Hence, referring to FIG. 8, the speed of the vehicle, s, initially exceeds the speed limit, I, for the road during a first period of time, $p_1$, until the driver notices the mobile safety camera, whereupon the driver causes the vehicle to decelerate during a second period of time, $p_2$, (a first portion of the profile). The driver then maintains the speed of the vehicle during a third period of time, $p_3$, at a reduced speed, the reduced speed being substantially the same as the speed limit, I, or substantially below the speed limit, I, (a second portion of the profile). This second portion can have a minimum predetermined duration that can be detected using pattern recognition. Thereafter, once the driver believes that the vehicle is no longer within the detection window of the mobile safety camera, namely that the mobile safety camera can no longer measure the speed of the vehicle, the driver accelerates again during a fourth period of time, $p_4$, (a third portion of the profile) and once a desired speed has been reached, for example exceeding the speed limit, I, the driver maintains the vehicle at the higher speed for a fifth period of time, $p_5$. In this respect, it can be seen the temporarily located road feature, for example the mobile safety camera, engenders vehicular speed change behaviour. In this example, the speed change profile is substantially U-shaped.

Referring back to FIG. 7, supported by the processing resource, the location determination module 600 generates (Step 700) location data that changes with time. The location data is indicative of the current location of the navigation apparatus 200. The speed calculator module 602 receives the location data that changes with time. The speed calculator module 602 is therefore able to calculate (Step 702) the speed of the navigation apparatus 200 with time. The location data is continuously fed to the speed calculator module 602 or periodically with sufficient resolution to enable determination of a speed profile to be determined. The calculated speed is passed to the pattern recognition engine module 604, which compares the pattern of changing speed with the predetermined speed profile 606 that corresponds to the graphically depicted pattern of driving behaviour of FIG. 8. Optionally, the speed calculator module 602 can provide location data to the pattern recognition engine apparatus 604 if required.

Figure 7:
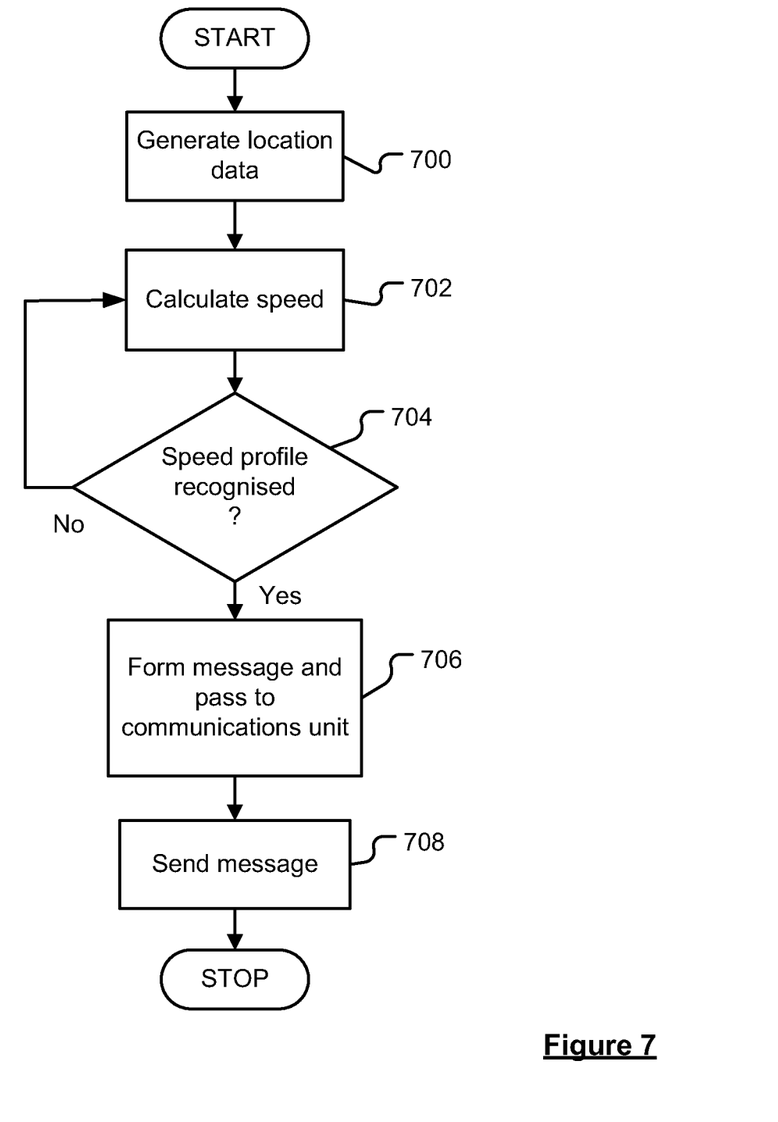
FIG. 7 is flow diagram of a method of detecting a temporarily located road feature supported by the safety camera detection module of FIG. 5.

Hence, it can be seen that the navigation apparatus 200 monitors the speed thereof. In this respect, the speed is an example of a parameter and other parameters associated with speed can be analysed, for example accelerated.

In the event that the pattern recognition engine apparatus 604 detects (Step 704) that the change in speed with time of the navigation apparatus 200 corresponds to the predetermined speed change profile 606, then the pattern recognition engine apparatus 604 generates (Step 706) a message 610 (FIG. 9) to be communicated to the server 150. In this example, the predetermined speed change profile is associated with the presence of the temporarily located road feature. The message 610 comprises a first portion 612 identifying the type of message, in this example a mobile safety camera notification message. The first portion 612 can therefore contain a code to represent the type of message, for example SCNOT. The message 610 also contains location data obtained from the location determination module 600 or the speed calculator module 602 identifying the approximate location at which the speed profile was detected. The location can, for example, correspond to the location at the time the vehicle began decelerating. Optionally, the message 610 can include supporting data 616, namely the speed calculated over time in respect of the period during which the speed profile was detected. The message 610 to be sent is, in this example, to be sent in anonymised form.

Figure 9:
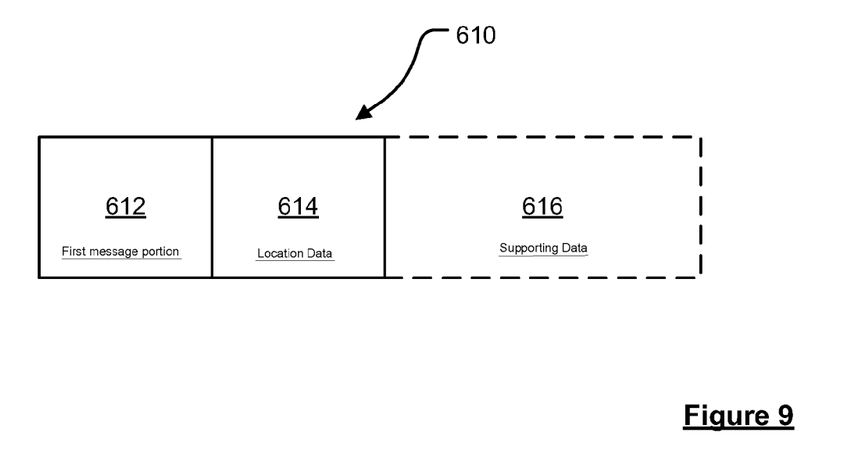
FIG. 9 is a schematic diagram of a message communicated from the navigation apparatus to the server apparatus of FIG. 2.

Thereafter, the message 610 is passed to the communications module 228, and the communications module 228 sends (Step 708) the message 610 to the server 150.

Figure 10:
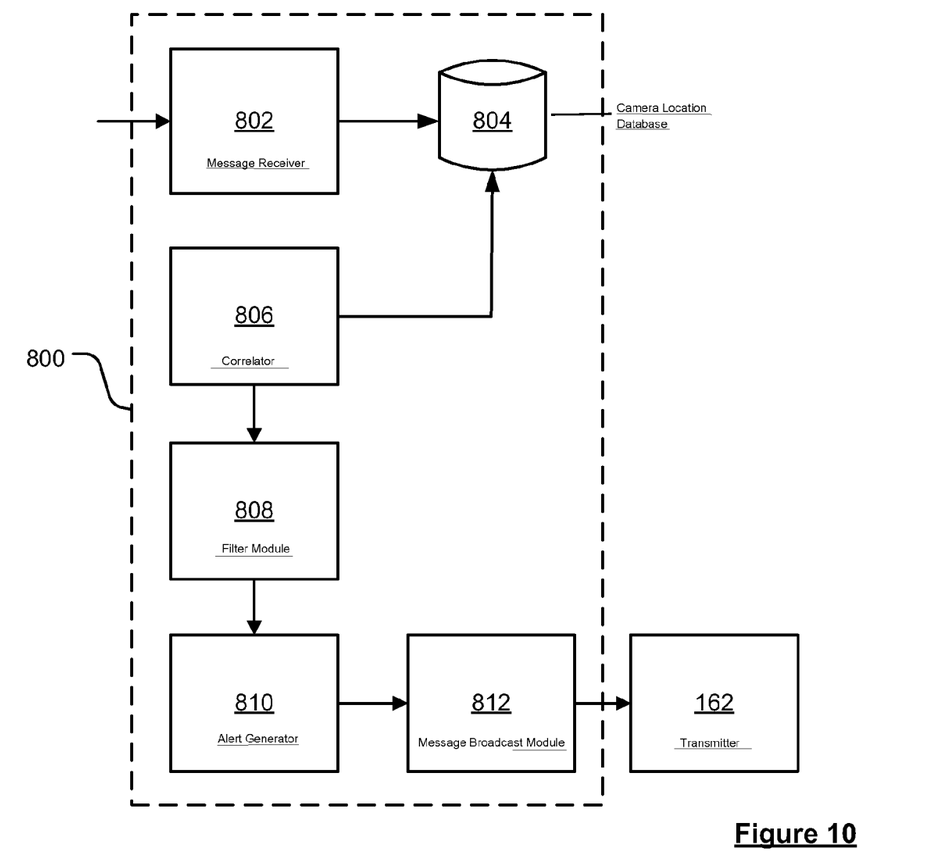
FIG. 10 is a schematic diagram of a processing resource supported by the server of FIG. 2.

Referring to FIG. 10, the server 150 supports a remote data processing resource 800. The resource 800 comprises a message receiver 802 operably coupled to a camera location database 804 stored by the mass data storage unit 160. A correlator 806 of the resource 800 is also operably coupled to the camera location database 804. The correlator 806 is operably coupled to a filter module 808, the filter module 808 being operably coupled to an alert generator 810. The alert generator 810 is operably coupled to a message broadcast module 812, the message broadcast module 812 being operably coupled to the transmitter 162.

In operation (FIG. 11), the message receiver 802 receives (Step 900) the message 610 generated by the navigation apparatus 200. The message receiver 802 extracts, in this example, the location data 614 and stores (Step 902) the location data in the safety camera location database 804. This process (Steps 900 and 902) is repeated in respect of other messages received pertaining to the location of mobile safety cameras.

Figure 11:
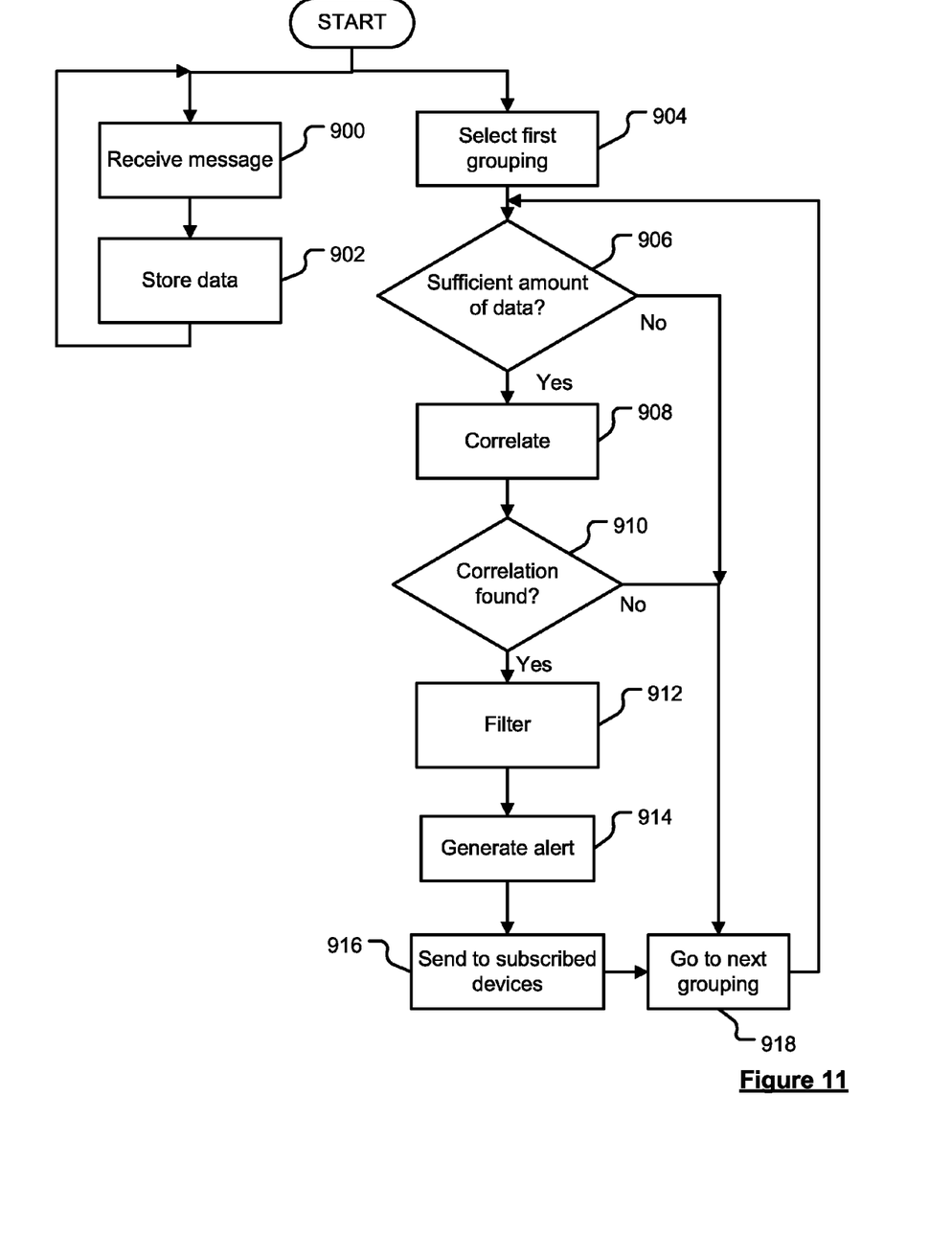
FIG. 11 is a flow diagram of a method of communicating a location of a mobile safety camera to navigation apparatus.

Additionally, the resource 800 performs functionality to detect the location of temporarily located road features, for example mobile safety cameras. In this respect, the correlator 806 identifies groupings of locations identified in the database 804, for example within a predetermined radius, such as 150 m. The correlator 806 then determines (Step 906) whether within the radius selected, a sufficient number of data points exist in order to make a sufficiently reliable determination as to the existence of a mobile safety camera. In this respect, any suitable known correlation function can be employed. In the event that insufficient data points exist, the correlator 806 examines a next grouping of data points within the predetermined radius (Step 918). Otherwise, if sufficient data points exist, the correlator 806 performs (Step 908) a correlation function in respect of the data points and determines (Step 910) whether a correlation exists. If no correlation is found, the correlator 806 examines a next grouping of data points within the predetermined radius (Step 918).

In the event that the correlation exists, the filter unit 808 compares (Step 912) the location of the detected mobile safety camera with a database (not shown) of location of known fixed safety cameras. The known fixed safety cameras are an example of a permanent road feature, in this example of the same type as the temporary located road feature. In the event that the filter unit 808 determines that the location identified as the location of a mobile safety camera is, in fact, the location of a fixed safety camera, the location of the mobile safety camera is flagged in the database 804 as being false. Hence, the filtering function eliminates incorrectly identifying a location of a permanent road feature as a location of a temporary road feature. If the location of the mobile safety camera identified is not found by the filter module 808 in the database of locations of known fixed safety cameras, the filter module 808 passes the location of the mobile safety camera to an alert generator, which generates (Step 914) an alert message identifying the location of the mobile safety camera. The alert message is then passed to the broadcast module 812, which in conjunction with the transmitter 162, sends (Step 916) the alert message to navigation apparatus or any other suitable device in respect of which have subscriptions for receiving information relating to safety cameras. The communication of the alert message to the navigation apparatus enables drivers to be warned when approaching the location of a mobile safety camera, thereby ensuring that the driver is reminded to drive safely and within the applicable speed limit.

Thereafter, the correlator 806 selects (Step 918) a next grouping of data points within the predetermined radius. In this example, once a final grouping of data points has been analysed, the analysis of the groupings of data points is analysed again starting from the first grouping of data points.

Upon receipt of the alert message, the navigation apparatus 200 (and others) updates a database of safety camera data stored thereby so that when the mobile safety camera is approached, a suitable warning is given, for example in the event that the driver is driving in an unsafe manner.

It should be appreciated that, together, the navigation apparatus 200 and the remote data processing resource constitute a system for identifying a temporarily located road feature that engenders vehicular speed behaviour change.

In another embodiment, the remote data processing resource assigns a predetermined validity period to the location of the mobile safety camera, for example a period of 2 hours or more, such as 4 hours. In this regard, the validity period identifies currency of the location identified; the validity period can be assigned by the correlator module 806 and communicated with the location of the mobile safety camera. The location identified is, by nature, only current for a limited period of time due to the mobility of the safety camera. Consequently, when the validity period has expired (and a start time can be provided), the navigation apparatus 200 either ignores the location communicated or removes it from its database.

In a further embodiment, the correlator module 806 can be arranged to receive confirmatory or corroborating data. In this respect, the confirmatory data can originate from a telephone call received at a call centre and electronically communicated to the remote data processing resource 800. Similarly, the confirmatory data can be received as a result of a message received via a messaging service, for example a text messaging service, either via a messaging interface or from a central service centre that relays such confirmatory data to the remote data processing resource. In particular, the call can be made or the message initiated by a user of the navigation apparatus in response to noticing the mobile safety camera. In another example, the navigation apparatus 200 can comprise a hardware button or support a software or virtual button that can be pressed by the user via the GUI of the navigation apparatus 200. In this regard, upon detection of the speed change profile corresponding to the detection by a driver of the mobile safety camera, the user can actuate the button (hardware or software). In response thereto, the navigation apparatus 200 then sends a confirmatory message to the remote data processing resource or includes a confirmatory flag or the like in the message to be sent to the remote data processing resource in response to the detection of the location of the mobile safety camera by the navigation apparatus 200. The buttons are examples of an input element and the navigation apparatus 200 can be configured to receive other types of input, for example voice input. The input provided is an example of a confirmatory gesture, the confirmatory gesture being converted to data by the input element. Furthermore, the navigation apparatus 200 can be arranged to prompt the user to press the button, the prompt being provided via the user interface of the navigation apparatus in response to the detection of the location of the mobile safety camera.

It will also be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

Whilst embodiments described in the foregoing detailed description refer to GPS, it should be noted that the navigation apparatus may utilise any kind of position sensing technology as an alternative to (or indeed in addition to) GPS. For example the navigation apparatus may utilise using other global navigation satellite systems such as the European Galileo system. Equally, it is not limited to satellite based but could readily function using ground based beacons or any other kind of system that enables the device to determine its geographic location.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared. The series of computer instructions can constitute all or part of the functionality described above, and can also be stored in any memory device, volatile or non-volatile, such as semiconductor, magnetic, optical or other memory device.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A navigation apparatus comprising:
a location determining unit for determining a location of the apparatus; and
one or more processors configured to monitor a speed of the apparatus, or a parameter associated therewith; wherein, when in use, the apparatus is arranged to:
detect the location of a temporarily-located road feature by detection of a speed profile of the apparatus corresponding to a predetermined speed change profile;
generate a message comprising data indicative of the location at which the speed profile was detected;
prompt a user of the navigation apparatus for a confirmatory input in response to the detection;

upon receipt of the confirmatory input, generate confirmatory data; and transmit the message to a remote data processing resource to update a listing of known feature locations.

2. An apparatus as claimed in claim 1, wherein the predetermined speed change profile is substantially U-shaped.

3. An apparatus as claimed in claim 1, wherein the predetermined speed change profile comprises a first portion corresponding to a reduction in speed.

4. An apparatus as claimed in claim 3, wherein the predetermined speed change profile comprises a second portion corresponding to maintaining speed substantially below or substantially equal to a speed limit.

5. An apparatus as claimed in claim 3, wherein the maintenance of the speed is for a minimum predetermined duration.

6. An apparatus as claimed in claim 4, wherein the predetermined speed change profile comprises a third portion corresponding to an increase in speed.

7. An apparatus as claimed in claim 6, wherein the third portion follows the second portion.

8. An apparatus as claimed in claim 4 wherein the second portion follows the first portion.

9. An apparatus as claimed in claim 1 wherein the prompt for confirmatory input comprises one of; a telephone call to the user, a text message or a prompt via the user interface of the navigation apparatus.

10. An apparatus as claimed in claim 1, configured to receive the confirmatory input via a hardware or software button on the navigation apparatus, or via voice input.

11. An apparatus as claimed in claim 1, further configured to transmit the message to a remote processing device.

12. An apparatus as claimed in claim 11, wherein the message further comprises the confirmatory data.

13. An apparatus as claimed in claim 1, wherein the apparatus is arranged to perform pattern recognition by comparing the speed profile of the apparatus with the predetermined speed change profile to determine a vehicular speed change behavior indicative of a temporarily located road feature.

14. An apparatus as claimed in claim 1, wherein the message comprises at least one of: data identifying at least one of a plurality of message types, location data and supporting data.

15. A method of identifying a temporarily located road feature that engenders vehicular speed behaviour change, the method comprising:

providing a navigation apparatus comprising:

a location determining unit for determining a location of the apparatus; and one or more processors configured to monitor a speed of the apparatus, or a parameter associated therewith;

detecting the location of a temporarily-located road feature by detection of a speed profile of the apparatus corresponding to a predetermined speed change profile;

generating a message comprising data indicative of the location at which the speed profile was detected;

prompting a user of the navigation apparatus for a confirmatory input in response to the detection;

upon receipt of the confirmatory input, generating confirmatory data; and transmit the message to a remote data processing resource to update a listing of known feature locations.

16. A non-transitory computer-readable medium which stores a set of instructions which when executed performs a method of identifying a temporarily located road feature that engenders vehicular speed behaviour change, the method executed by the set of instructions comprising:

providing a navigation apparatus comprising:

a location determining unit for determining a location of the apparatus; and one or more processors configured to monitor a speed of the apparatus, or a parameter associated therewith;

detecting the location of a temporarily-located road feature by detection of a speed profile of the apparatus corresponding to a predetermined speed change profile;

generating a message comprising data indicative of the location at which the speed profile was detected;

prompting a user of the navigation apparatus for a confirmatory input in response to the detection;

upon receipt of the confirmatory input, generating confirmatory data; and transmit the message to a remote data processing resource to update a listing of known feature locations.

\* \* \* \* \*